Feb. 16, 1954 L. L. MILLER 2,669,493
THRUST BEARING FOR ROLLING MILL ROLLS AND THE LIKE
Filed Jan. 12, 1950 4 Sheets-Sheet 1

Inventor:
LOUIS L. MILLER,
by: Donald G. Dalton
his Attorney.

Feb. 16, 1954     L. L. MILLER     2,669,493
THRUST BEARING FOR ROLLING MILL ROLLS AND THE LIKE
Filed Jan. 12, 1950     4 Sheets-Sheet 3

Inventor:
LOUIS L. MILLER,
by: Donald G. Dalton
his Attorney.

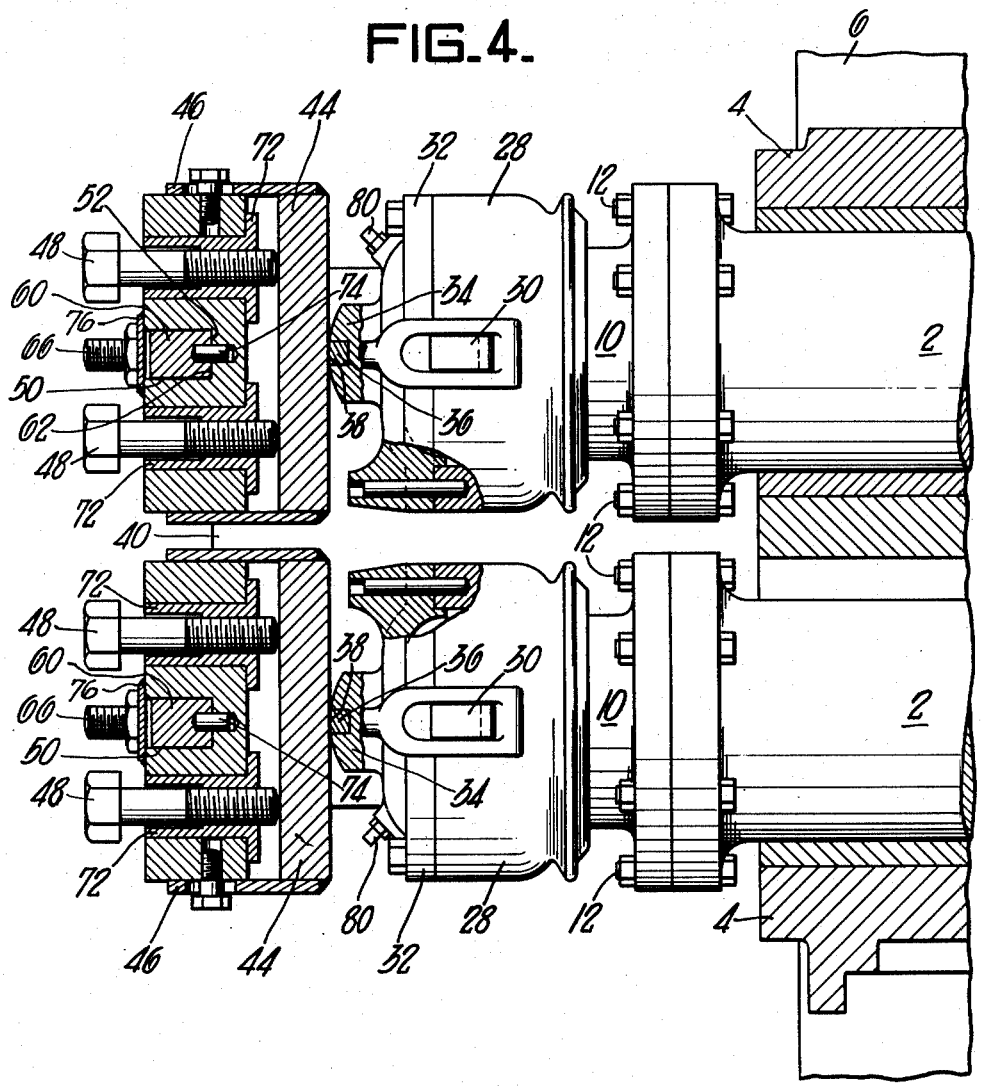

Patented Feb. 16, 1954

2,669,493

UNITED STATES PATENT OFFICE 2,669,493

THRUST BEARING FOR ROLLING MILL ROLLS AND THE LIKE

Louis L. Miller, Cleveland, Ohio, assignor to United States Steel Corporation, a corporation of New Jersey Application January 12, 1950, Serial No. 138,183

5 Claims. (Cl. 308—233)

This invention relates to improvements in rolling mill roll thrust bearings which provide means for axially adjusting the rolls.

It is among the objects of this invention to provide thrust bearings for small diameter rolls which are simple in design and rugged and durable in operation.

It is a further object of this invention to provide thrust bearings for rolling mill rolls which are readily adjustable to permit accurate control of the axial setting of the rolls.

It is another object of the present invention to provide a thrust bearing for rolling mill rolls having maximum size bearing members.

The foregoing and further objects of the present invention will be apparent from the following description when read in conjunction with the attached drawings, wherein:

Figure 4 is a vertical section on line IV—IV of Figure 3.

Figure 1:
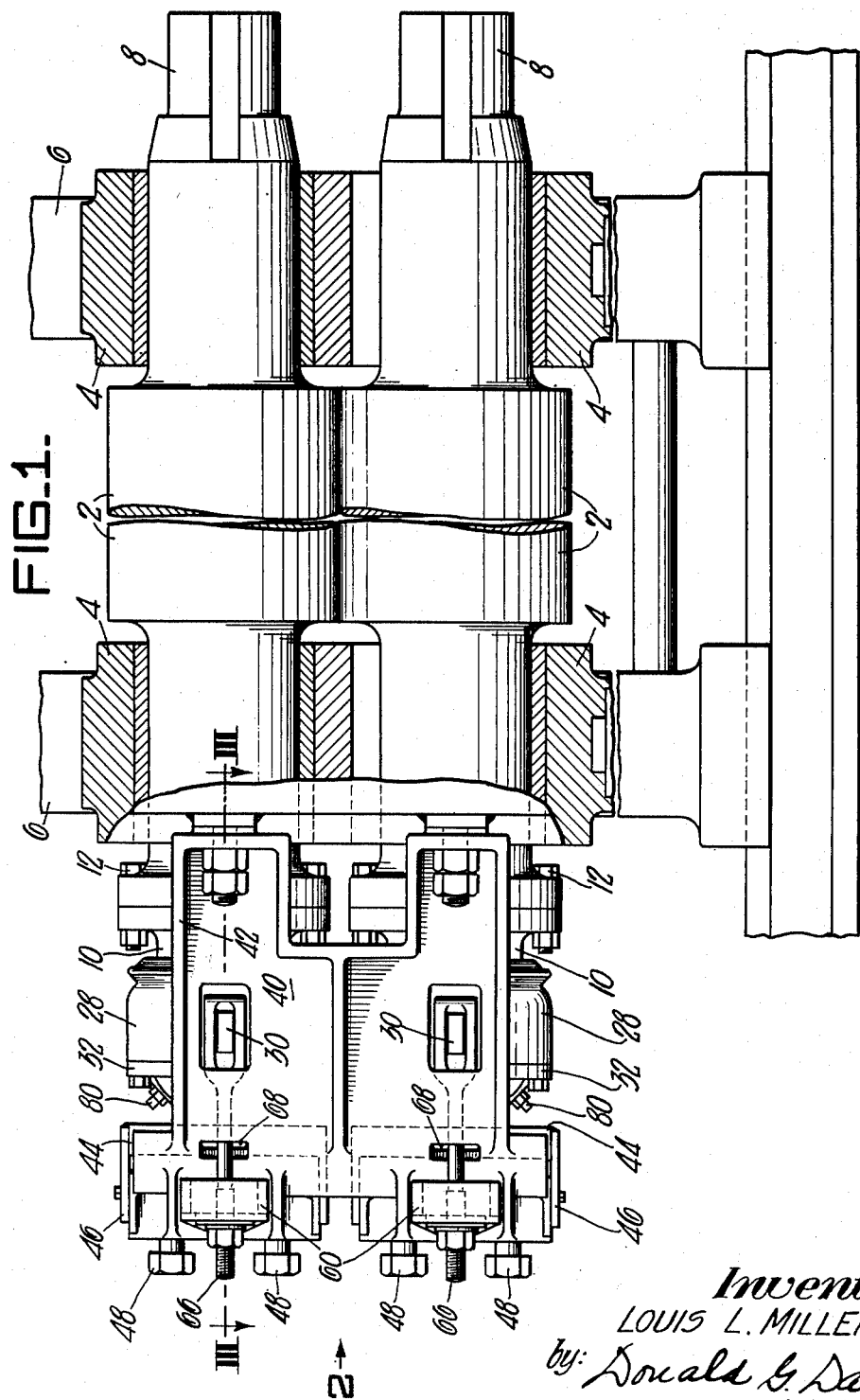
Figure 1 is a front elevation of a pair of rolling mill rolls, partly in section, and including a side elevation of the thrust bearing of this invention.
Figure 2:
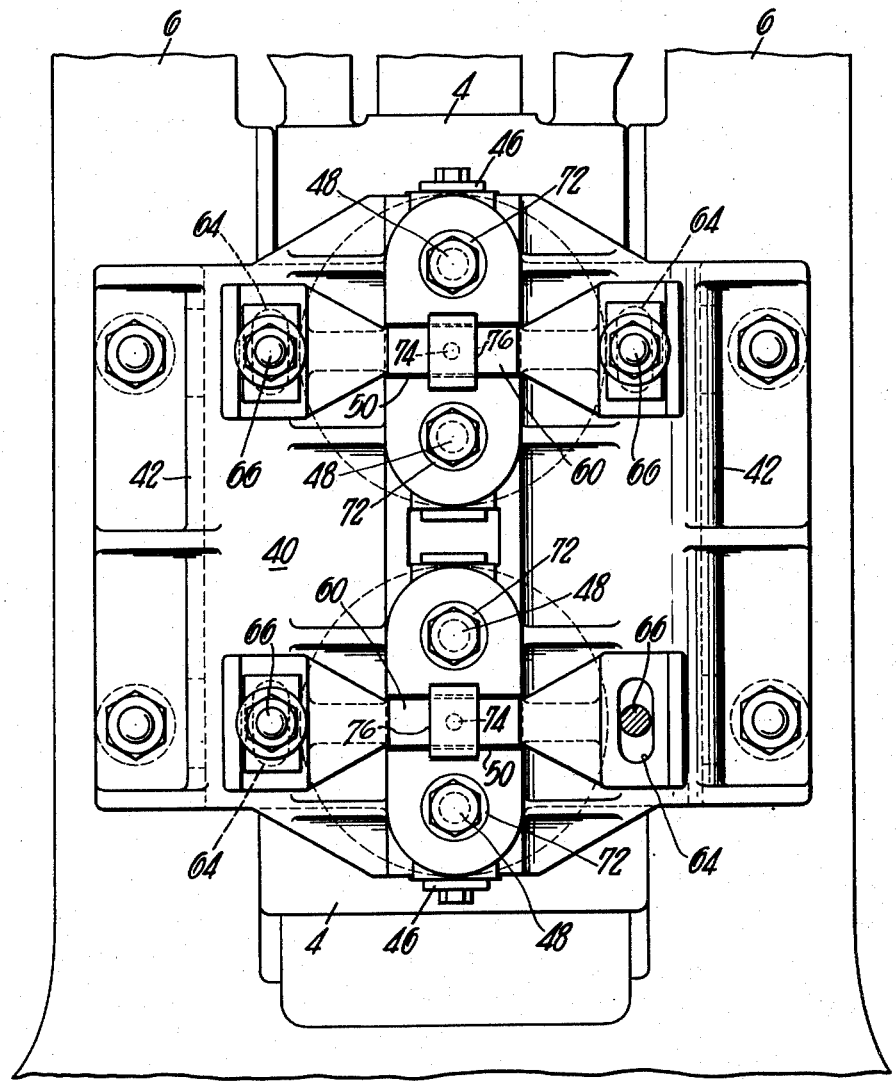
Figure 2 is an end elevation of the thrust bearing of Figure 1.
Figure 3:
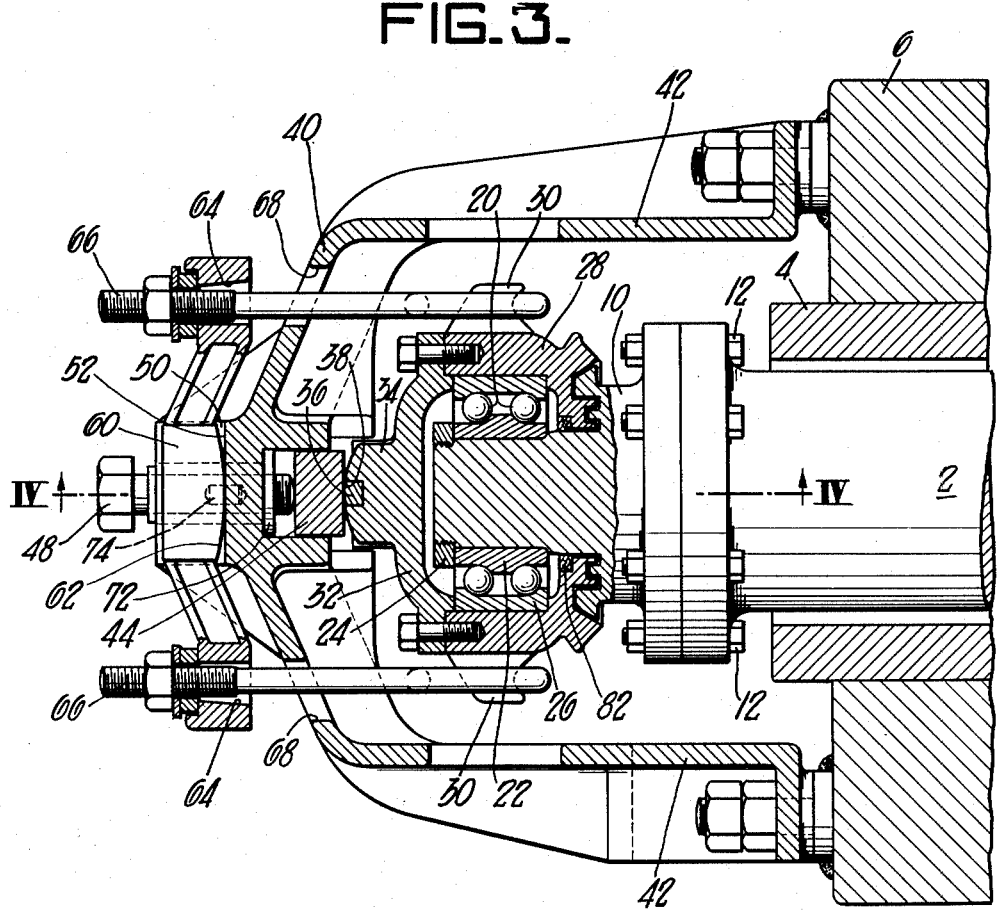
Figure 3 is a horizontal section on line III—III of Figure 1.

Referring more particularly to the drawings, the numeral 2 designates a pair of horizontally disposed continuous rod mill rolls journaled in chocks 4 mounted for vertical sliding movement in the mill housings 6. The right ends of the rolls have a connection 8 for universal couplings but conventional wobbler connections could of course be used instead. Stub shafts 10 are suitably secured to the opposite ends of the rolls, such as by bolts 12, so that the longitudinal axis of the shafts and the rolls are in alignment.

Disposed around and at the end of the stub shafts are the adjustable thrust bearings of my invention. Each of the thrust bearings includes a roller bearing 20 having an inner raceway 22 mounted on and secured to the stub shaft by ring nuts 24 so as to rotate with the roll and stub shaft and an outer raceway 26 mounted in a nonrotatable housing 28 having a pair of outwardly extending ears or lugs 30 disposed about the stub shaft. A bearing cover 32 is secured to the end of housing 28 and has an outwardly extending end portion 34 in which is securely mounted a hard wear resisting bearing member 36 having a spherical bearing surface 38.

The foregoing bearing and housing members are disposed in a generally U-shaped housing 40 of sufficient length to cover the assemblies on the two adjacent rolls. Legs 42 of the housing 40 are rigidly affixed to the mill housing 6. A pair of bearing plates 44, formed of hard wear resisting material, are adjustably mounted in the housing by means of slotted end members 46 and cap screws 48 having nuts 72 are provided for adjustably backing up the bearing plates. The outer mid-portion of the housing 40 is slotted as at 50 and the bottom of the slots provide flat bearing surfaces 52, in alignment with the longitudinal axis of the stub shafts and the spherical bearing surfaces 38.

Yoke members 60 are disposed in the slots 50 and have elongated arcuate bearing surfaces 62 adapted to provide line contact with the bearing surfaces 52. The ends of the yokes 60 are slotted as at 64 to receive the threaded ends of stirrup bolts 66, the eyes or stirrups of which are disposed over the lugs 30 of the bearing housing 28. These bolts pass through slots 68 in the housing 40, the slots being sufficiently large to permit free movement of the stirrup bolts due to roll movements during operation of the mill. A centering dowel or pin 74 is provided to center the yoke and end plates 76 are welded to the outer mid-portion of the housing at the slots 50 after the yoke is inserted to hold the yoke in position when the stirrup bolts are disengaged from the lugs 30.

In order to lubricate the inner bearings, lubricating fittings 80 may be provided on the bearing cover 32 and an oil or grease seal 82 may be provided between the bearing housing and the stub shaft.

With this arrangement, it will be noted that the bearings 20 can be of maximum diameter. The arrangement also provides line contact of bearing surface 62 on its engaged bearing surface 52 which is in axial alignment with the spherical bearing surface 38 and the longitudinal axes of the rolls and stub shafts. This results in a minimum of wear and even division of the thrust between the spherical bearing surface 38 and the arcuate bearing surface 62. Moreover, since the arcuate surface 62 is of considerable length, the unit bearing pressure on this bearing will be low. This arrangement gives positive assurance that the end thrust will be taken on the intended members and will not subject the ball bearing to unbalanced forces or cocking.

The slots 68 and yoke arrangement permits movement of the rolls incident to use and also permits grinding down or dressing of the rolls to a predetermined minimum, thus assuring full use of the rolls.

While I have shown and described one specific embodiment of my invention, it will be understood that this embodiment is merely for the purpose of illustration and description and that various other forms may be devised within the scope of my invention, as defined in the appended claims.

I claim:

1. In combination, a housing, a shaft journaled therein having a thrust bearing at one end thereof, said thrust bearing including rotatable means attached to the end portion of the shaft and non-rotatable means surrounding the same, said non-rotatable means including a bearing at the outer end thereof, a housing member secured to the shaft housing surrounding said non-rotatable means, means in said housing member adapted to engage said last mentioned bearing, a yoke member having a bearing surface engaging the outer end portion of said housing member and means securing said yoke to said non-rotatable member.

2. In combination, a housing, a shaft journaled therein having a thrust bearing at one end thereof, said thrust bearing comprising rotatable means attached to the end portion of the shaft and non-rotatable means surrounding the same, said non-rotatable means including a spherical bearing surface at the outer end thereof, a housing member secured to the shaft housing surrounding said non-rotatable means, a flat bearing surface in said housing member adapted to engage said spherical bearing surface, said flat bearing surface being adjustable axially of said shaft, a yoke member having an arcuate bearing surface engaging the outer end portion of said housing member, and means securing said yoke to said non-rotatable member.

3. In combination, a housing, a shaft journaled therein having a thrust bearing at one end thereof, said thrust bearing comprising rotatable means attached to the end portion of the shaft and non-rotatable means surrounding the same, said non-rotatable means including a spherical bearing surface at the outer end thereof, a housing member secured to the shaft housing surrounding said non-rotatable means, a flat bearing surface in said housing member adapted to engage said spherical bearing surface, said flat bearing surface being adjustable axially of said shaft, a yoke member having an arcuate bearing surface engaging the outer end portion of said housing member, said spherical bearing surface and said arcuate bearing surface being in alignment with the axis of said shaft, and means securing said yoke to said non-rotatable member.

4. In combination, a housing, a shaft journaled therein having a thrust bearing at one end, said thrust bearing comprising rotatable means secured to the end portion of the said shaft and non-rotatable means carried thereby, an anti-friction bearing between the said means, adjacent oppositely positioned bearing surfaces normal to the longitudinal axis of the said shaft and in alignment therewith carried by the shaft housing, an arcuate bearing contacting one of said bearing surfaces and a spherical bearing contacting the other of said bearing surfaces, said arcuate and spherical bearings being carried by said non-rotatable means, the center of generation of the spherical bearing lying substantially on the axial center line of said shaft and the center of generation of the arcuate bearing surface being a line normal to said shaft axis.

5. In combination, a housing, a shaft journaled therein having a thrust bearing at one end, said thrust bearing comprising rotatable means secured to the end portion of the said shaft and non-rotatable means carried thereby, an anti-friction bearing between the said means, adjacent oppositely positioned bearing surfaces normal to the longitudinal axis of the said shaft and in alignment therewith carried by the shaft housing, an arcuate bearing contacting one of said bearing surfaces and a spherical bearing contacting the other of said bearing surfaces, said arcuate and spherical bearings being carried by said non-rotatable means, the center of generation of the spherical bearing lying substantially on the axial center line of said shaft and the center of generation of the arcuate bearing surface being a line normal to said shaft axis and means for lubricating said anti-friction bearing.

LOUIS L. MILLER.

References Cited in the file of this patent

UNITED STATES PATENTS

| Number | Name | Date |
|---|---|---|
| 1,839,497 | Peterson | Jan. 5, 1932 |
| 2,155,747 | Wood | Apr. 25, 1939 |
| 2,175,783 | Rose | Oct. 10, 1939 |
| 2,178,628 | Duda | Nov. 7, 1939 |
| 2,200,837 | Fass | May 14, 1940 |

FOREIGN PATENTS

| Number | Country | Date |
|---|---|---|
| 13,471 | Great Britain | 1915 |
| 82,716 | Switzerland | Nov. 8, 1917 |